(12) United States Patent
Cheron et al.

(10) Patent No.: US 6,619,419 B1
(45) Date of Patent: Sep. 16, 2003

(54) MOTOR VEHICLE FUNCTIONAL FRONT END, WITHOUT RADIATOR

(75) Inventors: Hugues Cheron, Bourg Saint Christophe (FR); Laurent Decker, Boulogne Billancourt (FR); Bruno Ghiringhelli, Langres (FR); Alain Liadouze, Buc (FR); Marc Durbize, Jouars-Pont-de-Chartrain (FR)

(73) Assignee: Renault s.a.s., Billancourt (FR)

( * ) Notice: Subject to any disclaimer, the term of this patent is extended or adjusted under 35 U.S.C. 154(b) by 0 days.

(21) Appl. No.: 09/711,514

(22) Filed: Nov. 14, 2000

(30) Foreign Application Priority Data

Nov. 15, 1999 (FR) .............................. 99 14278

(51) Int. Cl.7 .............................................. B62D 21/00
(52) U.S. Cl. ...................... 180/311; 180/68.4; 280/781; 280/784; 296/203.02
(58) Field of Search ................................. 280/781, 784, 280/785; 180/68.4, 89.1, 311; 264/194, 203.02

(56) References Cited

U.S. PATENT DOCUMENTS 2,715,448 A * 8/1955 Zeeb ........................ 180/68.4
5,658,041 A * 8/1997 Girardot et al. ........... 180/68.4
6,412,855 B1 * 7/2002 Cantineau et al. .......... 296/194

FOREIGN PATENT DOCUMENTS

| DE | 43 36 030 C1 | 1/1995 | |
| FR | 2625164 | * 6/1989 | ................. 296/194 |
| FR | 2 754 235 A1 | 4/1998 | |
| JP | 3-279084 | * 12/1991 | ................. 296/194 |

OTHER PUBLICATIONS

Houghton Mifflin Company, The American Heritage Dictionary, c.1982, p. 96.*

* cited by examiner

Primary Examiner—Eric Culbreth
(74) Attorney, Agent, or Firm—Oliff & Berridge, PLC

(57) ABSTRACT

A motor vehicle front end includes at least one upper crossmember (1) capable of supporting the hinges or the catch for the vehicle bonnet, a support piece (2, 3) at each end of the crossmember capable of supporting at least one lighting unit (6) of the vehicle, a lower crossmember (4) extending from one support piece to the other and belonging to a vehicle energy-absorption system, and a cavity located between the two crossmembers and the two support pieces, leaving space for a radiator (12) supported by structure external to the functional front end. The upper crossmember is a hybrid crossmember consisting of a metal alloy section piece reinforced with plastic ribs.

12 Claims, 1 Drawing Sheet

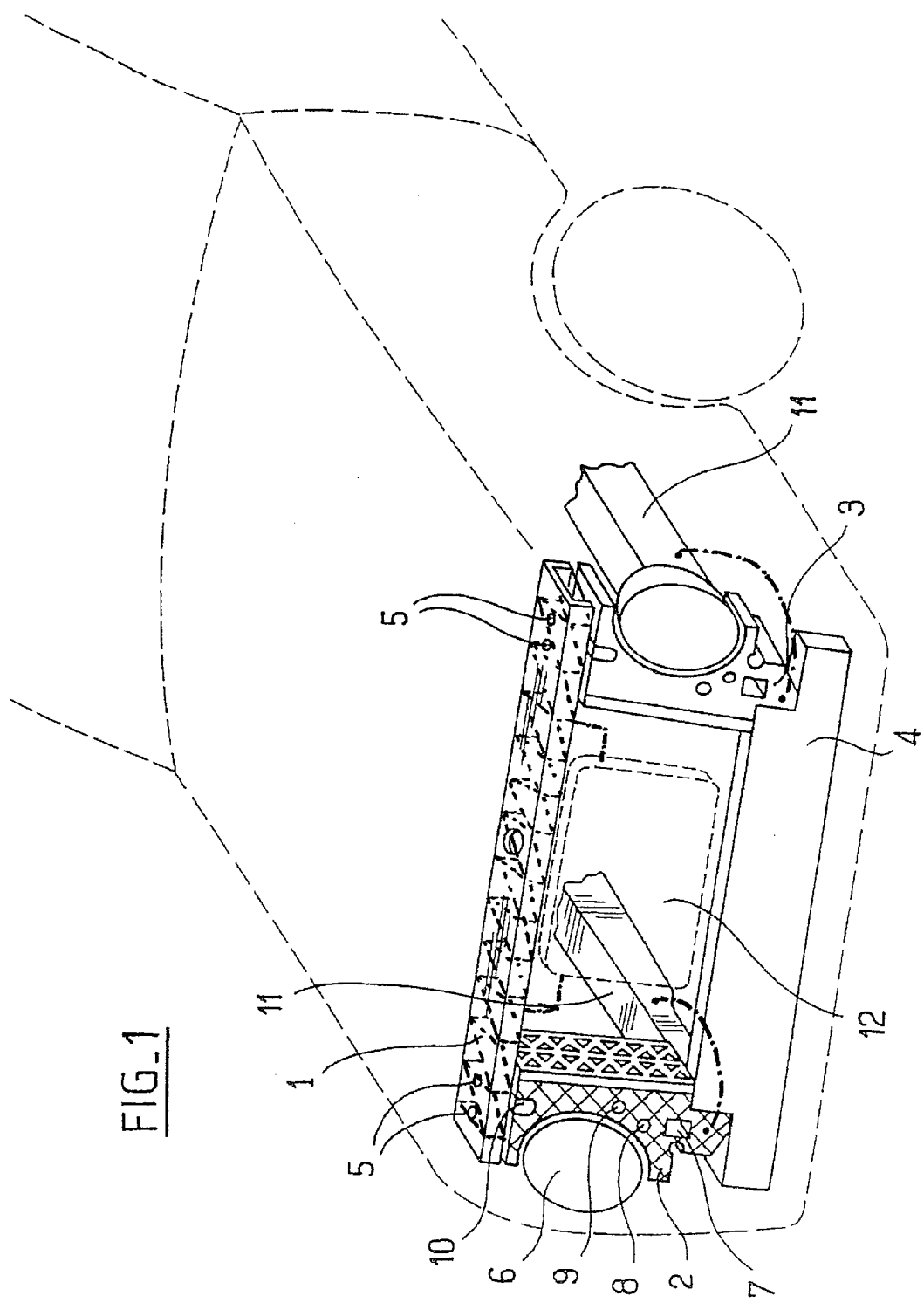
FIG_1

MOTOR VEHICLE FUNCTIONAL FRONT END, WITHOUT RADIATOR

The present invention relates to a motor vehicle functional front end.

It is known that a motor vehicle functional front end is a structure found in front of the engine block and which has the function of supporting various items at the front of the vehicle, and mainly the engine block radiator.

A functional front end such as this has the benefit that it can be pre-equipped away from the vehicle assembly line and installed on the vehicle in a single operation.

Around the radiator, which is the main item in the functional front end, there are various items such as a bonnet catch or hinges, lighting units, various reservoirs or electronic units or computers.

Conventionally, the structure of the functional front end is determined by the presence of the radiator and the reinforcements which are obtained by overmoulding metal inserts or by a change in material. These reinforcements transfer the stresses which are due to the presence of the radiator to the functional front end attachment points.

In other words, the functional front end of the motor vehicle may be considered as being a multiple support which organizes the arrangement of the various parts of the vehicle around the radiator.

On vehicles which do not have a functional front end, the various items are fixed in turn to the chassis of the vehicle, on the vehicle assembly line.

In one particular embodiment of the invention, the functional front end comprises a means for linking the radiator to the upper crossmember, but this linking means provides only relative positioning of the radiator on the functional front end, without supporting its weight.

In a preferred alternative form of this embodiment, the linking means is meltable and demountable.

It is therefore embedded in motor manufacturer custom that it is the presence of the radiator and the concern to support this radiator using a structure initially separate from the vehicle which justify the presence of a functional front end which, as a corollary, fulfills the additional function of supporting other items arranged around the radiator.

The present invention goes against this preconceived idea whereby it is necessary to have some way of supporting the radiator in order to provide a functional front end on a vehicle.

The subject of the present invention is a motor vehicle functional front end comprising at least one upper crossmember capable of supporting the hinges or the catch for the vehicle bonnet, a support piece at each end of the crossmember, each support piece being capable of taking at least one lighting unit of the vehicle, a lower crossmember extending from one support piece to the other and belonging to the vehicle energy-absorption system, and a cavity located between the two crossmembers and the two support pieces and leaving space for any radiator there may be, supported by means external to the functional front end.

The functional front end according to the invention can be used with an engine which supports its own radiator, the functional front end being arranged around the radiator, without supporting it, so that it fulfills only the so-called additional functions of conventional functional front ends, which consist in supporting various items such as, in particular, the indicators, the fog lights, the headlight washers, the lateral repeaters, the horn, the bonnet stop, the bonnet seal, the active cruise control, the apron, the resonator, the washer fluid bottle, the electric case for switches and fuses, the LPG expander, the fuel filter, the computer, the convergent, the front fairing, the air intake and the alarm.

In one particular embodiment of the invention, the functional front end comprises a means of fixing the radiator to the upper crossmember, but this fixing means provides only relative positioning of the radiator on the functional front end, without taking its weight.

In a preferred alternative form of this embodiment, the fixing means is meltable and demountable.

In a preferred embodiment, the upper crossmember is a hybrid crossmember consisting of a metal alloy section piece reinforced with plastic ribs, and the support pieces are made of polypropylene strengthened with 30% long glass fibres (of the order of 12 mm long). The lower crossmember is chosen according to the vehicle impact resistance specification. This crossmember will preferably incorporate energy absorbers of the DANNER unit type.

The support pieces are advantageously screwed to the upper crossmember.

In one particular embodiment of the invention, the support pieces which are mounted at the ends of the crossmember comprise means of fixing to the longerons of the vehicle.

Thus, the support pieces form struts which stiffen the upper crossmember by virtue of the fact that they are secured to the longerons, and increase the overall inertia of the functional front end.

With a view to making the invention easier to understand, one embodiment thereof, given by way of an example which does not restrict the scope of the invention, will now be described with reference to the single appended figure which depicts the front of a motor vehicle.

In this FIGURE, the outline of the vehicle is given schematically in broken line and only the functional front end and the front end of the longerons have been depicted.

The functional front end is made up of an upper crossmember 1, of two support pieces 2 and 3 each mounted at one end of the upper crossmember 1 and of a lower crossmember 4.

The upper crossmember is a metal alloy section piece of U-shaped cross-section, the rigidity of which has been improved by overmoulding plastic ribs (schematically shown by dashed lines).

In the middle of its top face, the crossmember 1 has an orifice for attaching a bonnet catch (not depicted).

The support pieces 2 and 3 are firmly secured to the crossmember 1 by screwing through holes 5 made in the crossmember.

Each support piece is made of plastic and comprises a number of ribs, the function of which is to stiffen the said piece while at the same time lightening it.

The ribs are arranged in a honeycomb configuration.

As can be seen in the figure, two sets of ribs with different orientations are preferably provided, one set of ribs being orientated along the axis of the vehicle and the other transversely to the vehicle in order to obtain support pieces of high rigidity.

Each support piece comprises a number of housings to accommodate fixing attachments or items of the vehicle.

In the example depicted, each support piece houses a lighting unit 6 and, on its front face, comprises housings to house an indicator (housing 7), a headlamp washer (housing 8), a washer fluid bottle (housing 9), and a bonnet stop (housing 10).

On their (non-visible) rear face, the support pieces may also support an LPG expander, a horn, a filter and various electrical and electronic units of the vehicle.

The lower part of each support piece is arranged in such a way that it can be secured to a longeron 11 of the vehicle.

Thus, in addition to its item-supporting function, each support piece provides the entire functional front end with rigidity by transmitting the rigidity of the longerons 11 of the vehicle to the upper and lower crossmembers (shown schematically by dashed connection).

The lower crossmember is an impact crossmember belonging to the vehicle energy-absorption system.

Via each support piece, this crossmember also bears against the longerons 11 and may incorporate or support DANNER absorbers.

Broken lines have been used in the central part of the functional front end to depict a radiator 12 which is mounted on the vehicle independently of the functional front end, for example being supported by the engine block.

This radiator finds its place in the functional front end, like in conventional front ends, except that it is not in any way supported by the functional front end according to this invention. However, there may be means for fixing the radiator to the upper crossmember (1) (schematically shown by dashed connection) that provides only relative positioning of the radiator on the functional front end, without taking its weight.

The various items supported by the functional front end are gathered on the lateral support pieces which may, in other embodiments which have not been illustrated, occupy a larger volume, for example comprising a lateral return also covering the flanks of the front of the vehicle.

It must be clearly understood that the embodiment which has just been described does not present any limitation and that it can be modified in any desirable way without thereby departing from the scope of the invention.

What is claimed is:

1. A motor vehicle front end comprising at least one upper crossmember capable of supporting a hinge for a vehicle bonnet, a support piece at each end of the crossmember, each support piece being capable of supporting at least one lighting unit of the vehicle, a lower crossmember extending from one support piece to the other and belonging to an energy-absorption system of the vehicle, and a cavity located between the two crossmembers and the two support pieces leaving space for a radiator supported by means external to the front end, the upper crossmember being a hybrid crossmember consisting of a metal alloy section piece reinforced with plastic ribs.

2. The front end according to claim 1, further comprising a means for linking the radiator to the upper crossmember, this linking means providing only relative positioning of the radiator on the front end, without supporting its weight.

3. The front end according to claim 2, wherein the linking means is meltable and demountable.

4. The front end according to claim 1, wherein the support pieces are made of polypropylene strengthened with 30% elongated glass fibres.

5. The front end according to claim 1, wherein the support pieces are screwed to the upper crossmember.

6. The front end according to claim 1, wherein the support pieces comprise means for fixing to longerons of the vehicle.

7. A motor vehicle front end comprising at least one upper crossmember capable of supporting a catch for a vehicle bonnet, a support piece at each end of the crossmember, each support piece being capable of supporting at least one lighting unit of the vehicle, a lower crossmember extending from one support piece to the other and belonging to an energy-absorption system of the vehicle, and a cavity located between the two crossmembers and the two support pieces leaving space for a radiator supported by means external to the front end, the upper crossmember being a hybrid crossmember consisting of a metal alloy section piece reinforced with plastic ribs.

8. The front end according to claim 7, further comprising a means for linking the radiator to the upper crossmember this linking means providing only relative positioning of the radiator on the front end, without supporting its weight.

9. The front end according to claim 7, wherein the linking means is meltable and demountable.

10. The front end according to claim 7, wherein the support pieces are made of polypropylene strengthened with 30% elongated glass fibres.

11. The front end according to claim 7, wherein the support pieces are screwed to the upper crossmember.

12. The front end according to claim 7, wherein the support pieces comprise means for fixing to longerons of the vehicle.

* * * * *

UNITED STATES PATENT AND TRADEMARK OFFICE
CERTIFICATE OF CORRECTION

PATENT NO. : 6,619,419 B1
DATED : September 16, 2003
INVENTOR(S) : Hugues Cheron et al.

It is certified that error appears in the above-identified patent and that said Letters Patent is hereby corrected as shown below:

<u>Title page,</u>
Item [73], Assignee, change "Renault s.a.s., Billancourt (FR)" to -- Renault s.a.s., Boulogne Billancourt (FR) -- and add the second Assignee -- Compagnie Plastic Omnium, Lyon (FR) --.

Signed and Sealed this

Tenth Day of February, 2004

JON W. DUDAS
*Acting Director of the United States Patent and Trademark Office*